E. E. & E. M. SCHROCK.
SEED PLANTING MACHINE CLUTCH.
APPLICATION FILED FEB. 1, 1909.

1,293,624.

Patented Feb. 4, 1919.

Inventors:
Edgar E. Schrock,
and Emanuel M. Schrock.
By:
Atty.

UNITED STATES PATENT OFFICE.

EDGAR E. SCHROCK AND EMANUEL M. SCHROCK, OF PONTIAC, ILLINOIS, ASSIGNORS, BY MESNE ASSIGNMENTS, TO INTERNATIONAL HARVESTER COMPANY, A CORPORATION OF NEW JERSEY.

SEED-PLANTING-MACHINE CLUTCH.

1,293,624.  Specification of Letters Patent.  Patented Feb. 4, 1919.

Application filed February 1, 1909. Serial No. 475,533.

*To all whom it may concern:*

Be it known that we, EDGAR E. SCHROCK and EMANUEL M. SCHROCK, citizens of the United States, residing at Pontiac, in the county of Livingston and State of Illinois, have invented certain new and useful Improvements in Seed-Planting-Machine Clutches, of which the following is a specification.

Our invention relates to improvements in clutch mechanism of seed planters that have an intermittent movement mechanism adapted to deposit a predetermined quantity of seed in a hill as the machine passes over the ground, and so arranged that any desired number of seeds may be planted in a hill according to the fertility of the soil, by the movement of a lever while the planting machine is in operation.

Our improvements consist of improved, new and simple devices designed for rotating more or less the shaft which drives the seed dropping mechanism, all as hereinafter described and shown in the drawings.

Figure 1:
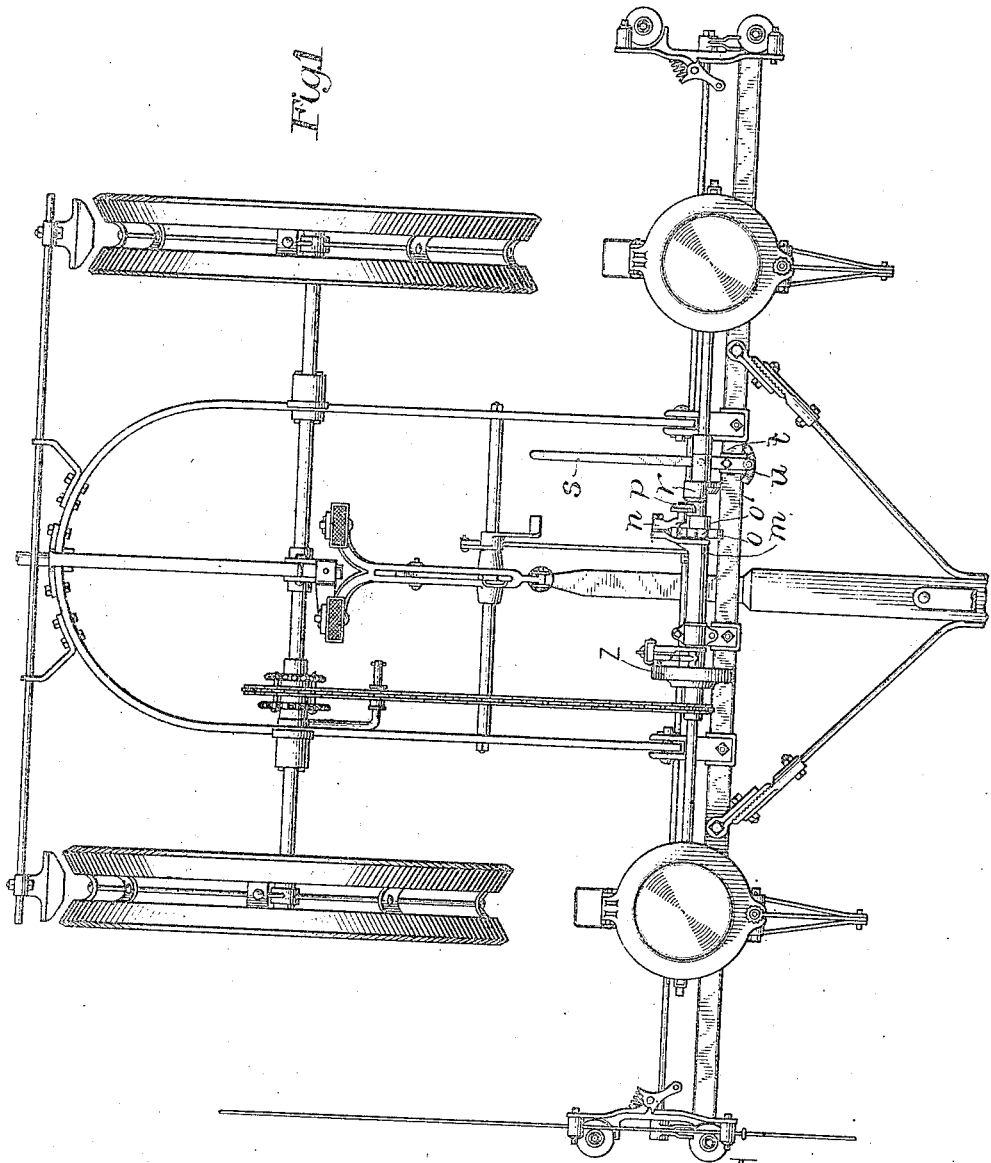
Figure 1 is a plan view of a corn planter equipped with our improved clutch mechanism.
Figure 2:
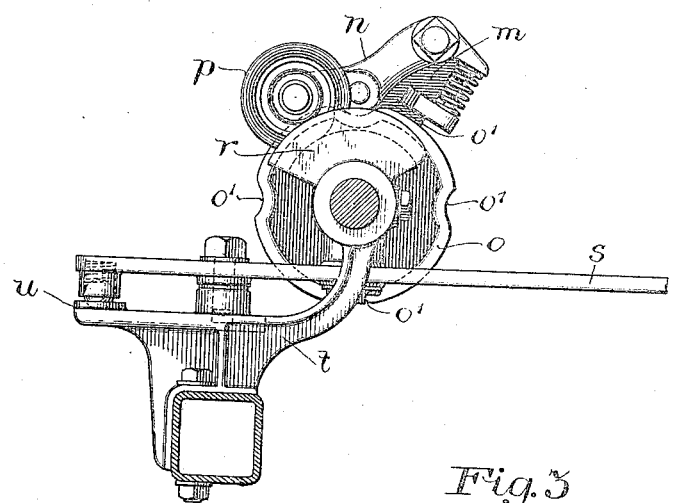
Fig. 2 is an end elevation of part of the clutch mechanism shown in Fig. 1.
Figure 3:
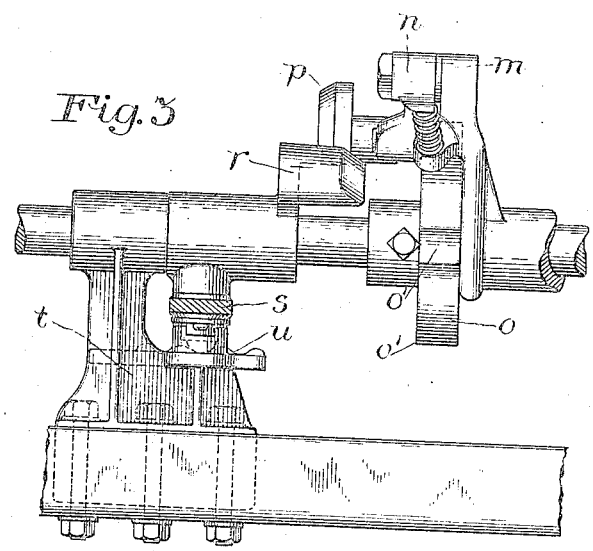
Fig. 3 is a side elevation of the mechanism shown in Fig. 2.

In the construction shown in Figs. 1, 2 and 3, $m$ is an intermediate piece which engages with the driving clutch $z$ and has a pawl $n$ to engage the disk $o$ which is secured to the operating shaft. This head $o$ has notches or proper depressions with incline approaches $o^1$ for the spring actuated pawl $n$ to engage in. The pawl $n$ has an angular arm supporting the roller $p$, which travels on the tracks $r$, having inclined sides and an inclined approach, as shown, for the roller. This track system $r$ is pushed under the roller more or less to hold the pawl out of engagement with the notches in the disk $o$, being so constructed that the action of changing from one working engagement to another can be made instantly at any time or point in the operation of the machine. The movable track $r$ is held and operated by any convenient means, as by the lever $s$, which is pivoted to the shaft supporting bracket $t$, which also has the adjustment rack $u$ to hold the track $r$ in the position wanted.

In the construction described therefore a spring actuated pawl is controlled by a lever actuated track to make the engagements to operate the pawl to engage the ratchet head and drive the operating shaft one complete or partial revolution to operate the seed dropping mechanism of the planting machine.

While we have in this application specifically described one embodiment of our invention, it is to be understood that the form shown herein is used for purposes of illustration and that the invention may be embodied in other forms without departing from its spirit, it being our intention to include all such modifications within the scope of the appended claims.

We claim:

1. In a planter, a frame, a seed dropping plate carried thereby, continuously operating mechanism including a ratchet wheel, a clutch comprising a body carrying two pawls one of said pawls adapted to be thrown into engagement with said ratchet wheel and to be moved a certain predetermined distance, and the other pawl adapted to be thrown into engagement with said dropping plate, and means including a lever pivoted on said frame and operated entirely by the movement of said lever about its pivot for lifting the pawl out of engagement with said dropping plate operating mechanism.

2. In a planter, a frame, a seed dropping plate, continuously operating mechanism including a ratchet wheel, a clutch comprising a body carrying two pawls, one of said pawls adapted to be thrown into engagement with said ratchet wheel and to be moved a certain predetermined distance, and the other pawl adapted to be thrown into connection with said dropping plate, one of said pawls having a roller provided with a beveled outer edge, a pawl engaging device having a sliding head provided with cam tracks thereon of varying lengths, said tracks having inclined side approaches adapted to engage with the beveled edge of said roller, and pivoted means movable in a single plane and operatively connected to said sliding head for moving said head laterally to engage the roller with the cam tracks.

EDGAR E. SCHROCK.
EMANUEL M. SCHROCK.

Witnesses:
F. E. GRANDY,
J. A. KERR.

Copies of this patent may be obtained for five cents each, by addressing the "Commissioner of Patents, Washington, D. C."